P. S. GRAVES & J. I. OLLIVETTI.
HOT WATER DISPENSER AND DRINKING GLASS STERILIZER.
APPLICATION FILED APR. 15, 1914.
1,109,414.
Patented Sept. 1, 1914.
2 SHEETS—SHEET 1.
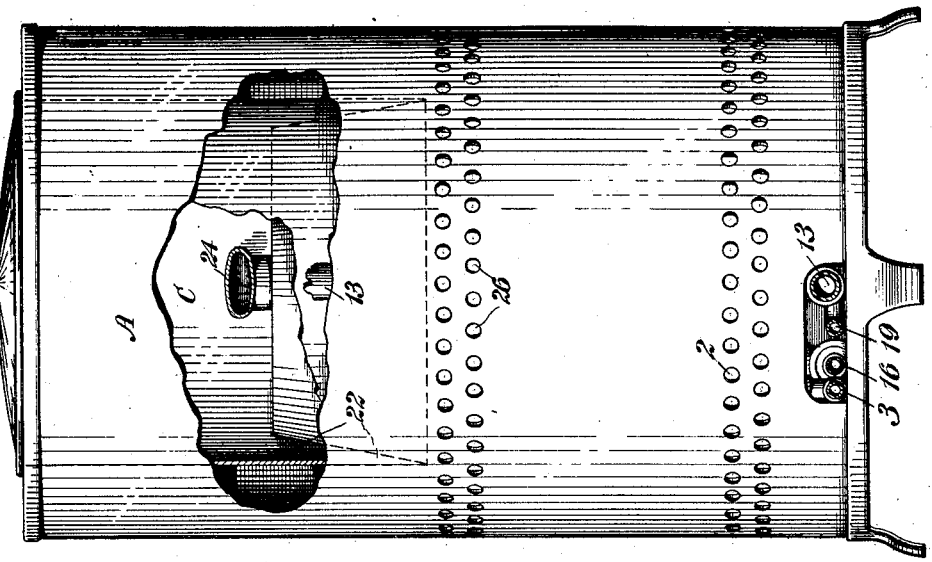
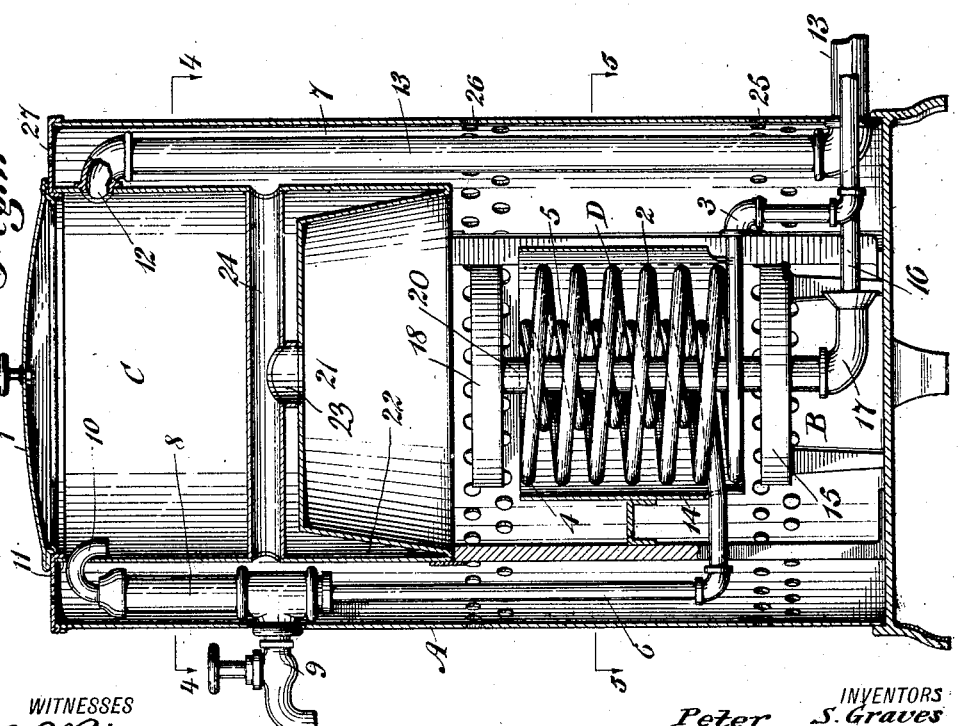
WITNESSES
INVENTORS
Peter S. Graves
James I. Ollivetti
BY
ATTORNEYS

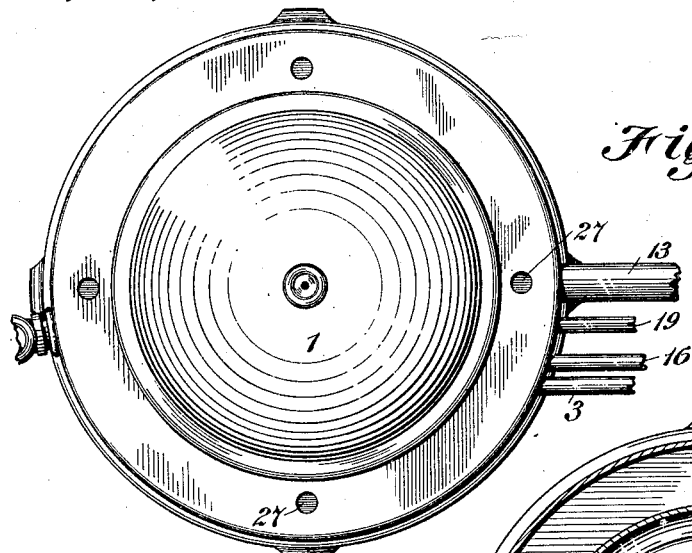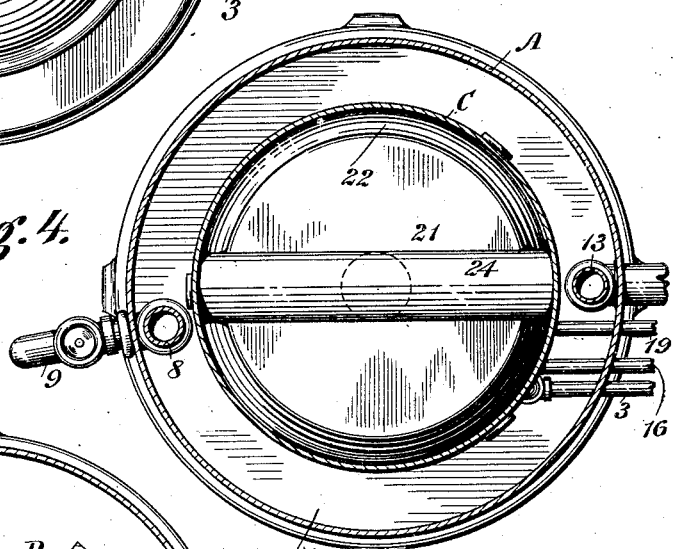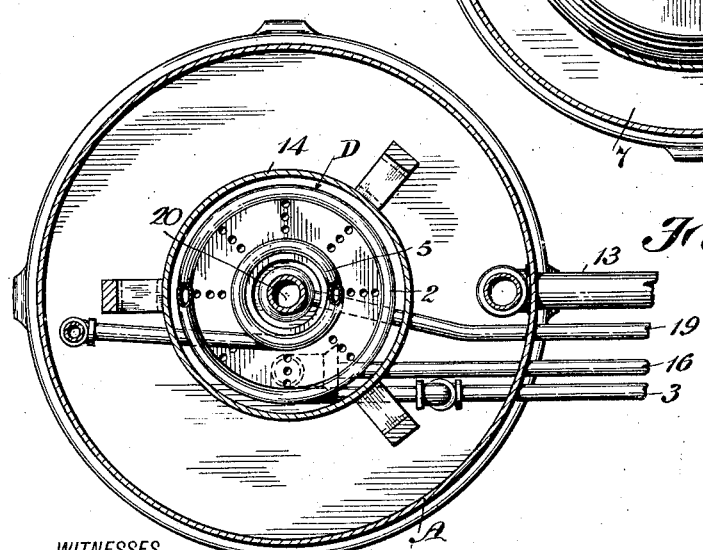

UNITED STATES PATENT OFFICE.

PETER S. GRAVES AND JAMES I. OLLIVETTI, OF PLATTSBURG, NEW YORK.

HOT-WATER DISPENSER AND DRINKING-GLASS STERILIZER.

1,109,414.  Specification of Letters Patent. Patented Sept. 1, 1914.

Application filed April 15, 1914. Serial No. 831,953.

*To all whom it may concern:*

Be it known that we, PETER S. GRAVES and JAMES I. OLLIVETTI, citizens of the United States, and residents of Plattsburg, in the county of Clinton and State of New York, have invented a new and Improved Hot-Water Dispenser and Drinking-Glass Sterilizer, of which the following is a full, clear, and exact description.

This invention relates to a hot water dispenser and drinking glass sterilizer which is especially adapted for use in bar rooms, restaurants, drug stores and like places, where drinks are sold to the public, whereby the glasses or other drinking vessels can be easily, quickly and effectively sterilized and hot water dispensed where such is necessary for the preparation of hot drinks.

The general objects of the present invention are to improve and simplify the construction and operation of hot water heating and dispensing devices and sterilizers of the character referred to so as to be reliable and efficient in use, comparatively inexpensive to manufacture and so designed as to require very little attention.

Another object of the invention is the provision of a novel combination of hot water heating means, a dispensing chamber or reservoir, and a sterilizing tank into which the reservoir continuously overflows, so that there will be a constant supply of fresh hot water in the dispensing chamber available for use in making hot drinks, and the water in the sterilizing tank is kept in a sanitary condition, as the said tank overflows through a suitable drain pipe.

With such objects in views, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a central vertical section of the apparatus; Fig. 2 is a side view thereof with a portion of the casing and sterilizing tank broken away; Fig. 3 is a plan view of the apparatus; and Figs. 4 and 5 are horizontal sections on the line 4—4 and 5—5, Fig. 1.

Referring to the drawing, A designates the tank of the apparatus, which has in its lower part heating means B and in its upper part a sterilizing tank or chamber C, the latter being provided with a removable lid or cover 1, whereby access can be had to the tank for inserting or removing the glasses or drinking vessels which are preferably arranged in a holder, not shown, designed to receive a large number of vessels.

Associated with the heating means is a hot water heater D which includes an external helical coil 2 which has its lower end connected with a supply pipe 3 leading from a water service system, and the upper end 4 of this coil 2 is connected with an inner helical coil 5, the lower end of this inner coil being connected with a vertical pipe 6 which extends upwardly between the casing A and tank C, said tank being of somewhat smaller diameter so as to provide an annular heating space 7 around the sterilizing tank. The upper end of the pipe 6 is connected with the lower end of a hot water reservoir 8 of suitable size, which has connected therewith an external faucet 9, whereby hot water can be dispensed for making hot drinks. The upper part of this reservoir 8 is provided with an overflow spout 10 which passes through an opening 11 in the side of the tank C at the upper part thereof. Water may flow continuously through the hot water heater D, pipe 6, reservoir 8, and overflow pipe 10 at a slow rate, so that water is constantly changing and kept fresh in the dispensing reservoir 8, and as the overflow is into the sterilizing tank C, the supply of water in the latter is kept comparatively fresh. The tank C is filled to a level approximately of the overflow spout 10, and it in turn has an overflow opening 12 which is connected with a pipe 13 which drains off the water from the sterilizer and conveys it to a sewer or any other suitable outlet.

The heating coil, which is preferably inclosed by a hood 14, open at its top and bottom, is disposed over a gas or other burner 15 that forms the lower part of the heating means B of the apparatus, and gas is supplied to this burner through the pipe 16, which discharges into a mixing tube 17. An upper burner 18 forms part of the heating means and is supplied with fuel through the pipe 19 and mixing tube 20 and serves as the principal heating means for the sterilizer C, the bottom 21 of the sterilizer being reëntrant so as to form an annular water leg 22. The sterilizer has a central duct or flue 23 for the products of combustion, and this duct has laterally-extending branches 24 which have their outer ends open at the sides of the tank C so as to discharge into the annular flue space 7 between the tank and casing A. For a draft through the casing a series of openings 25 and 26 are arranged on a level with the burners, and openings 27 are provided in the top of the casing. By the arrangement shown it will be seen that the water is effectively heated before as well as after reaching the sterilizing chamber, it being heated before reaching the sterilizing chamber so that there will be hot water ready for use in mixing hot drinks, as previously explained.

From the foregoing description taken in connection with the accompanying drawings, the advantages of the construction and method of operation will be readily understood by those skilled in the art to which the invention appertains, and while we have described the apparatus which we now consider to be the best embodiment thereof, we desire to have it understood that the apparatus shown is merely illustrative, and that such changes may be made when desired as are within the scope of the appended claims.

Having thus described our invention, we claim as new and desire to secure by Letters Patent:

1. An apparatus of the class described comprising a hot water heater, a sterilizing tank, and a hot water dispensing device connected with the said heater and overflowing into the said tank, said hot water heater and dispensing device being disposed externally to the sterilizing tank.

2. An apparatus of the class described comprising a hot water heater, a sterilizing tank, a hot water dispensing device connected with the said heater and overflowing into the said tank, and an overflow connected with the said tank and so arranged as to maintain a body of water in the latter for sterilizing purposes.

3. An apparatus of the class described comprising a casing, a sterilizing tank therein, a heating coil disposed under the tank, heaters for the tank and coil, a hot water dispensing reservoir connected with the coil and overflowing into the tank, and an overflow for the tank.

4. An apparatus of the class described comprising a casing, a tank in the top thereof, a heating coil below the tank, a burner between the tank and heating coil, a burner under the heating coil, a hot water dispensing chamber connected with the delivery end of the coil and arranged within the casing, a faucet connected with the chamber and extending out of the tank, and an overflow connection between the top of the reservoir and the top of the tank.

5. An apparatus of the class described comprising a casing, a sterilizing tank therein, said tank being formed with a reëntrant bottom and having a flue extending from the bottom through the tank to the side thereof for products of combustion, a burner under the tank, a hot water heating means, a burner therefor, a dispensing reservoir connected with the hot water heating means and overflowing into the top of the said tank, and an overflow pipe for said tank.

In testimony whereof we have signed our names to this specification in the presence of two subscribing witnesses.

PETER S. GRAVES.
JAMES I. OLLIVETTI.

Witnesses:
HARRY A. THOMAS,
ANDREW E. BARDE.

Copies of this patent may be obtained for five cents each, by addressing the "Commissioner of Patents, Washington, D. C."